G. E. GRAHAM.
LOCKING STEERING MECHANISM FOR MOTOR VEHICLES.
APPLICATION FILED JUNE 6, 1917.
1,289,158.
Patented Dec. 31, 1918.
2 SHEETS—SHEET 2.
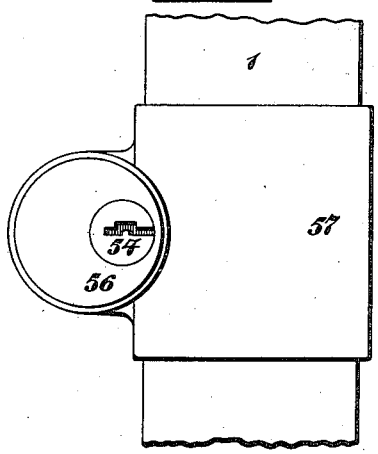
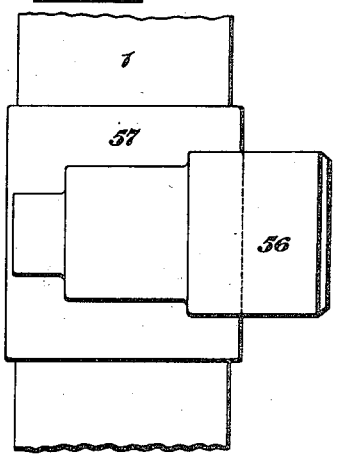
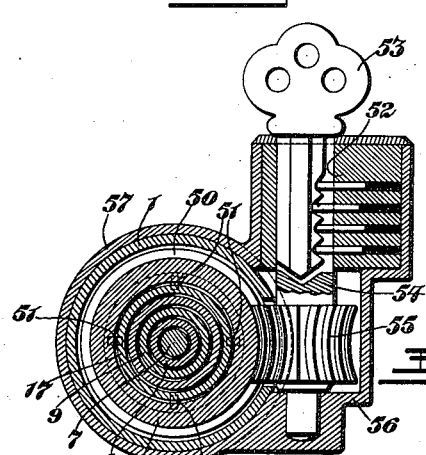
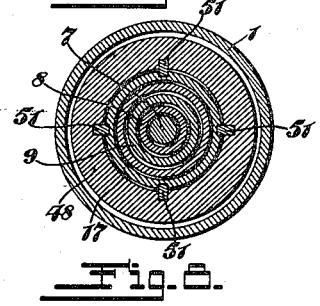
Inventor.
GEORGE E. GRAHAM.
By
His Attorneys.
Attest.
Charles A. Becker.

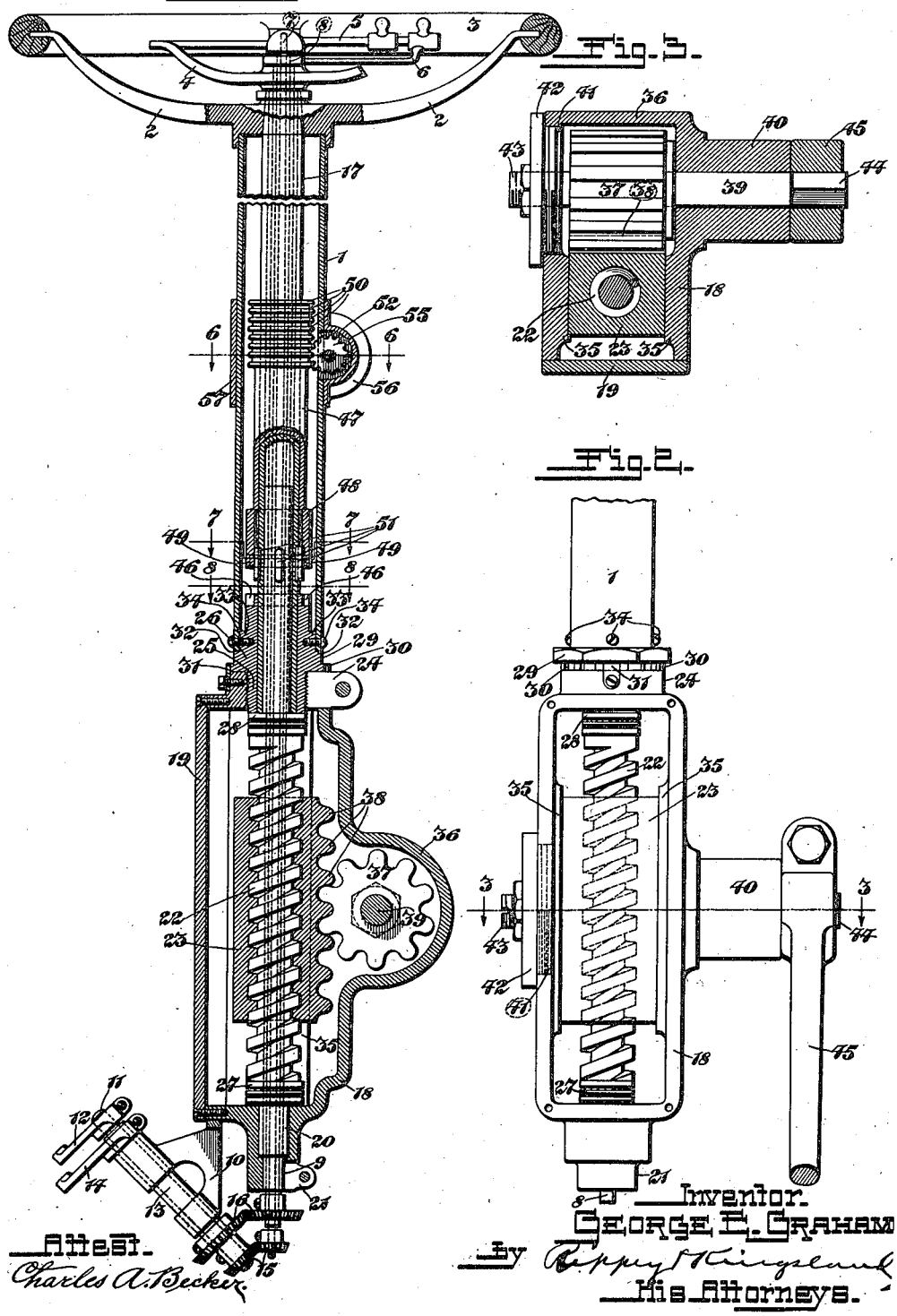

UNITED STATES PATENT OFFICE.

GEORGE E. GRAHAM, OF ST. LOUIS, MISSOURI.

LOCKING STEERING MECHANISM FOR MOTOR-VEHICLES.

1,289,158.  Specification of Letters Patent.  Patented Dec. 31, 1918.

Application filed June 6, 1917.  Serial No. 173,099.

*To all whom it may concern:*

Be it known that I, GEORGE E. GRAHAM, a citizen of the United States, residing in the city of St. Louis and State of Missouri, have invented a new and useful Locking Steering Mechanism for Motor-Vehicles, of which the following is a specification.

This invention relates to locking steering mechanism for motor vehicles, and consists in the novel construction, design, arrangement and combination of parts hereinafter more fully disclosed.

An object of the invention is to provide a steering mechanism having incorporated therewith a key-controlled locking device whereby the steering post may be locked against rotation, thereby disabling the steering mechanism and preventing the vehicle from being driven.

Another object of the invention is to provide a steering mechanism including a novel form of gear control associated with mechanism whereby the steering post may be locked against rotation when desired to disable the steering mechanism.

Another object of the invention is to provide an improved steering mechanism which may be economically manufactured, readily assembled and which will be efficient in steering operations and which is accommodated in its structure for association therewith of the usual spark and throttle control levers.

With the foregoing objects as well as many other additional advantages and features of construction attainable from the invention in view, I have designed, arranged and combined the parts and elements as hereinafter described, reference being made to the accompanying drawings in which one embodiment of the invention is illustrated, and in which—

Figure 1 is a longitudinal section through the steering mechanism illustrating the associated parts.

Fig. 2 is a plan view of the steering gear housing showing the arrangement of the steering gear mechanism with the associated elements.

Fig. 3 is a cross sectional view taken substantially on the line 3—3 of Fig. 2 of the steering gear elements.

Fig. 4 is an elevation of a part of the key-control fork for the steering post showing the manner in which it is applied to the steering column.

Fig. 5 is an elevation of the same part of the mechanism viewed at right angles to the illustration in Fig. 4.

Fig. 6 is a cross section particularly illustrating a part of the key-control lock mechanism taken substantially on the line 6—6 of Fig. 1.

Fig. 7 is a cross section taken substantially on the line 7—7 of Fig. 1 further illustrating the details of the locking mechanism in connection with other associated parts.

Fig. 8 is a cross sectional view on the line 8—8 of Fig. 1 illustrating further details of the construction.

Fig. 9 is an elevation of the bushing constituting an element of the construction.

Fig. 10 is an elevation of the sleeve constituting a part of the locking mechanism removed from the assembly.

In the embodiment of the invention illustrated in the drawings, the steering mechanism includes a steering column 1 at the top of which is a steering wheel spider 2 to which is attached the usual steering wheel 3. Within the circumference of the steering wheel 3 is provided the usual spark control and throttle control lever quadrant 4 associated with the spark control lever 5 and the throttle control lever 6. The spark control shaft 7 is connected with the spark control lever 5, said shaft extending longitudinally through the mechanism being incased within the hollow shaft 8 to which is attached the throttle control lever 6. Both the spark control shaft and the throttle control shaft are housed within a tubular shaft 9 which extends from end to end of the mechanism in the usual manner.

At the lower end of the mechanism and supported by a bracket 10 are the spark control shafts and arms, 11 and 12, respectively, and the throttle control shaft and arms 13 and 14, respectively. The usual bevel gear construction 15 connects the shafts 7 and 11 of the spark controlling mechanism and the usual bevel gear construction 16 connects the shafts 8 and 13 of the throttle controlling mechanism.

The steering post 17 is fitted over the tubular shaft 9 that incases both the shafts 7 and 8. The steering post is tubular in form and is surmounted at its upper end by the spider 2 of the steering wheel 3 with which it is rigidly connected. The gear construction of the steering mechanism is housed in a case 18 which may be supported in the vehicle by attaching it by brackets to any rigid part of the vehicle construction proper. The case 18 is a one-piece construction except for a removable cover plate 19, and constitutes a container for lubricant for lubricating the gear parts of the steering mechanism. The gear case 18 at one end is provided with a journal section 20 for the lower end of the steering column. A split clevis construction 21 extends beyond the journal portion 20 and is designed to embrace the end of the tubular shaft 9, whereby the same is rigidly supported at its lower end. The steering post is formed with a screw section 22 which is disposed within the gear case 18, the same fitting through an internally threaded rack block 23.

The upper end of the gear case 18 has a tubular clevised end section 24, the opening of which is internally threaded and is adapted to receive a threaded portion 25 of an adjusting bushing 26. When the clevised end section 24 is in clamped adjustment it serves to hold the bushing 26 from rotation. A pair of end thrust bearings 27 and 28, respectively, embrace the steering post at each end of the screw section 22. The thrust bearing 27 bears against the inner lower wall of the case 18 adjacent to the journal portion 20 and against a shoulder at the end of the screw section 22 of the post. The thrust bearing 28 bears against the inner end of the bushing 26 and against a shoulder at the upper end of the screw section 22. This arrangement of the thrust bearings, the force of which tends in opposite directions, serves to hold the steering post against vibration and prevents end lash of the screw section of the steering post when the same is operated.

The bushing 26 which is fully illustrated in detail in Fig. 9 is provided with a polygonal tool engaging surface 29 under which is a notched flange 30 for the reception of a retaining finger 31 which is removably secured to the tubular end section 24 of the case 18.

The lower end of the column 1 shoulders against a flange 32 of the bushing 26 and embraces a reduced section 33 thereof to which it is attached by a series of screws 34 passing through openings in the column 1 and into threaded seats disposed about the periphery of the section 33 of the bushing 26.

The side walls of the case 18 are enlarged as indicated at 35 (Fig. 3) to match the side faces of the rack block 23 thereby constituting a sliding fit bearing for the block. Within an enlargement 36 of the case 18 is arranged a pinion 37, the teeth of which mesh with a rack 38 formed in the lower face of the rack block 23. The pinion 37 has integrally formed therewith a shaft 39 disposed at right angles to the axis of the steering post, and which shaft is journaled at one end in a tubular projection 40 from the side of the enlargement 36 of the case 18. At the opposite side of the enlargement 36 of the case 18 is a threaded opening 41 which receives an adjusting bushing 42 in which is mounted an adjusting screw 43, the opening being of sufficient diameter so that the pinion 38 may be inserted therethrough. The adjusting screw 43 is designed for adjustment of the shaft 39 of the pinion 38 and is designed so that any wear of the parts may be compensated for by adjustment and to permit the parts to be readily assembled and disassembled. The end of the shaft 39 has a polygonal portion 44 to receive the steering arm 45, it being understood that the latter connects by the usual ball and socket construction to rods which are associated with the steering knuckle of the wheel control.

It will be observed that the upper end of the bushing 26 is provided with a series of teeth 46. Embracing the steering post is a sleeve 47 which has an enlarged hub 48 provided with a series of teeth 49 at its end and with a circular rack 50 at its upper end. The sleeve is feathered on the steering post, being keyed thereto by keys 51 operating in key-ways in the usual manner. The sleeve 47 is adapted to slide longitudinally of the steering post, so that the series of teeth 46 and 49 may be moved into and out of locking position. The movement of the sleeve is accomplished by a key-controlled device comprising a tumbler section 52 operated by a key 53. A revoluble member 54 within the tumbler section at one end and extending beyond the tumbler section at the other end carries a pinion 55 which is in constant mesh with the circular rack 50 on the sleeve 47. The tumbler section as well as a case 56 for the pinion 55 has joined thereto a band section 57. The band section 57 embraces the steering column and is fastened thereto in any suitable manner preferably by brazing or welding the same in place, so as to prevent the removal thereof. The revoluble element 54 may be actuated only by the key 53 so that it is only possible to raise and lower the sleeve 47 by the key 53.

It is a known function of the tumbler lock construction that after a complete revolution of the revoluble element of the lock, it will be permanently held in position after the removal of the key. Thus, in its adaptation to the present construction, it is possible to raise and lower the sleeve 47 so as to bring the series of teeth 46 and 49 into coöperative locked position and out of locked position by operating the lock device by the key. When the sleeve is either in locked or unlocked position there is no possibility of moving it from one to the other position except by the operation of the lock device through the medium of a specially designed key appropriate for the control of the lock device.

From the foregoing it will be understood that the parts have been carefully designed for convenience of assembly and for efficiency in operation.

As the lock construction is entirely incased in the steering column it is impossible to tamper with the same without disassembling the entire steering mechanism. The disassembling of the steering mechanism is difficult so that it is practically impossible for an unauthorized person, unequipped with a controlling key, to drive the motor vehicle when the lock mechanism is set. When the locking mechanism is unlocked the steering post is free to rotate and as the same is rotated the rack block will be moved, thereby driving the pinion 37 which through its connections with the arm 45 operates the same.

The steering gear proper is of such construction that the vibration from the wheels of the vehicle is not imparted to the steering wheel. In other words, it is of the irreversible steering gear type. The construction of the floating rack block operated by the screw portion of the steering post provides a powerful actuator for the pinion 37. As the leverage is of high efficiency the steering mechanism may be operated with very little power applied to the steering wheel.

I am aware that the construction may be modified in numerous particulars without in any wise departing from the spirit and scope of the invention. I do not limit myself therefore to the exact construction shown and described, but what I claim and desire to secure by Letters Patent, is:—

1. Steering mechanism, comprising a case composed of integral side and bottom walls having longitudinal bearing portions upon the inner sides of the side walls, and a removable cover in connection with the side walls closing the case; a rack block within the case having its opposite sides bearing against the bearing portions on the side walls of the case and being out of contact with the removable cover; a screw shaft journaled in the case and having threaded engagement with said block whereby said block will be moved longitudinally by the turning of said shaft and will be held from turning by the side walls of the case; a shaft journaled in the case at right angles to the rack block; a pinion on said last-named shaft meshing with the rack of the rack block, and a steering arm connected with said last-named shaft.

2. Steering mechanism, comprising a case composed of integral side and bottom walls having longitudinal bearing portions on the inner sides of the side walls, and a removable cover in connection with the side walls closing the case; a rack block within the case having its opposite sides bearing against the bearing portions of the case, whereby said block is guided and held from turning when moved longitudinally in the case; a screw shaft journaled in the case and having threaded engagement with said block whereby said block will be moved longitudinally by the turning of said shaft and will be held from turning by the side walls of the case; revoluble devices in connection with the shaft limiting longitudinal movement of said block and preventing contact of the block with the ends of the case; a shaft journaled in the case at right angles to the block; a pinion on said last-named shaft meshing with the rack of the rack block; and a steering arm connected with said last-named shaft.

GEORGE E. GRAHAM.